United States Patent [19]

Loyd, Jr.

[11] 4,072,448
[45] Feb. 7, 1978

[54] BUILT-UP MAINSHAFT FOR MULTI-UNIT ROTARY MECHANISMS AND METHOD OF MANUFACTURE THEREOF

[75] Inventor: Robert W. Loyd, Jr., Wyckoff, N.J.

[73] Assignee: Curtiss-Wright Corporation, Wood-Ridge, N.J.

[21] Appl. No.: 684,256

[22] Filed: May 7, 1976

[51] Int. Cl.$^2$ .......................... F01C 1/02; G05G 5/16; F16D 1/08; F01L 1/34
[52] U.S. Cl. ........................................ 418/60; 418/94; 29/526 R; 74/568 R; 123/90.17; 123/90.34; 123/90.6; 403/344
[58] Field of Search ................... 418/60, 94, 210, 212, 418/213; 123/8.07, 90.17, 90.34, 90.6; 403/309, 313, 344, 354, 375; 74/567, 568 R; 29/526

[56] References Cited

U.S. PATENT DOCUMENTS

| | | | |
|---|---|---|---|
| 217,068 | 7/1879 | Cranston | 74/568 R |
| 476,303 | 6/1892 | Potter | 403/344 |
| 1,269,075 | 6/1918 | Grabill | 403/344 |
| 1,408,381 | 2/1922 | Moors | 418/60 |
| 2,162,977 | 6/1939 | Searles | 403/354 |
| 3,240,423 | 3/1966 | Jones | 418/60 |
| 3,917,424 | 11/1975 | Zugel | 403/344 |

FOREIGN PATENT DOCUMENTS

| | | | |
|---|---|---|---|
| 976,463 | 9/1963 | Germany | 403/344 |
| 1,106,123 | 5/1961 | Germany | 403/344 |
| 1,028,825 | 5/1966 | United Kingdom | 403/344 |

Primary Examiner—John J. Vrablik
Attorney, Agent, or Firm—Arthur Frederick; Victor D. Behn

[57] ABSTRACT

The built-up mainshaft has a plurality of eccentric elements secured to an elongated shaft element in end-to-end angular off-set relationship to each other. Each of the eccentric elements has integral cylindrical body and axially extending sleeve-like portions and an axially extending bore therethrough to receive therein the elongated shaft element. Each eccentric element is scored to render the cylindrical body portion thereof deformable in an inward direction toward the shaft element. A clamping means is provided for each eccentric element to coact with the scoring to effect deformation of the associated cylindrical body portion and secure the latter in torque transmitting relationship with the shaft element.

In a narrower aspect of the invention, the scoring of each eccentric element comprises a radial slot extending axially the length of the bore and in the plane passing through the axis of the bore and radially, from the bore, through the wall of the sleeve-like portion and into the cylindrical body portion. A chordal slot is provided to extend in the sleeve-like portion at or adjacent the juncture of the latter and the cylindrical body portion and intersecting the radial slot.

6 Claims, 9 Drawing Figures

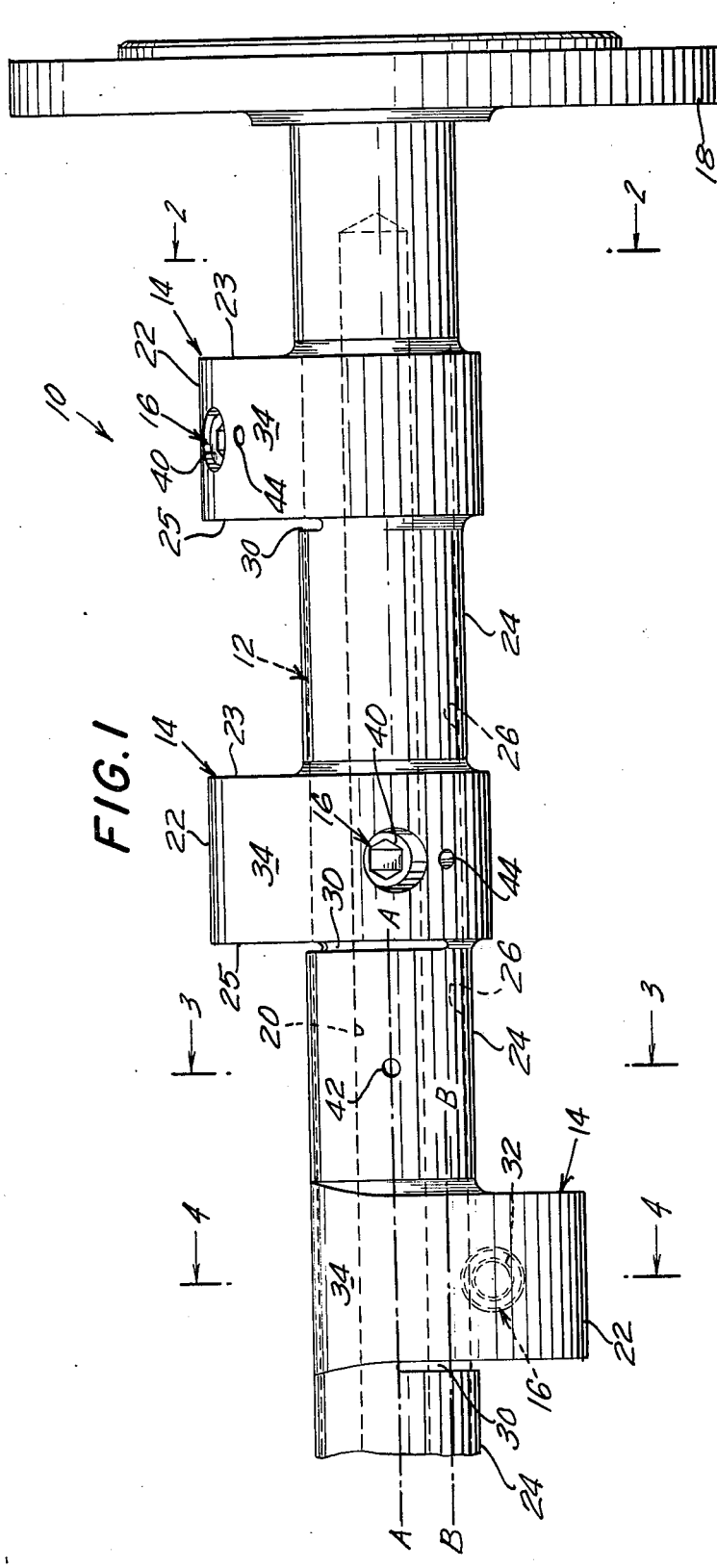
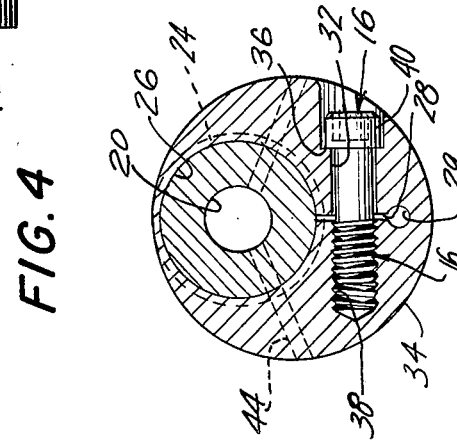
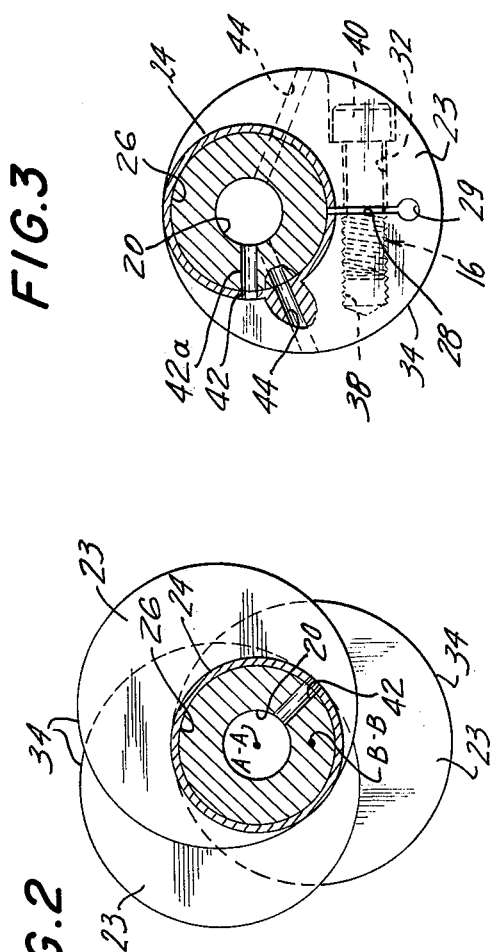
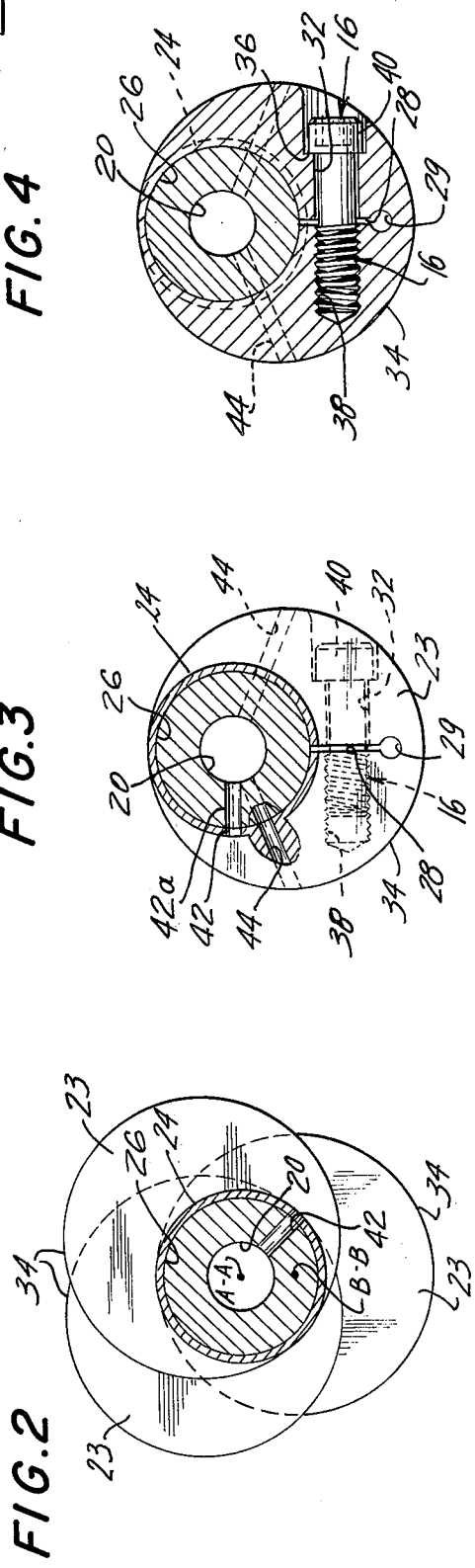
FIG. 1
FIG. 2
FIG. 3
FIG. 4

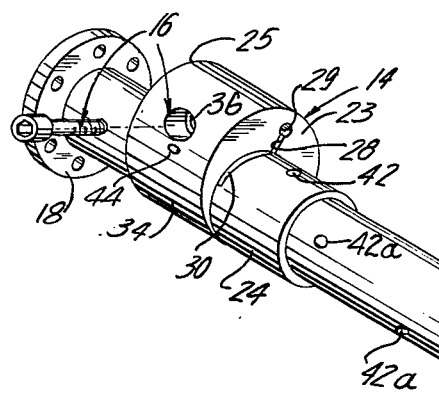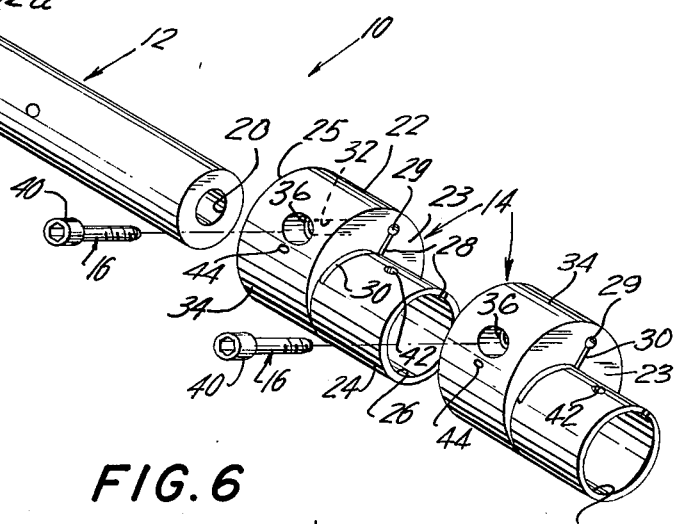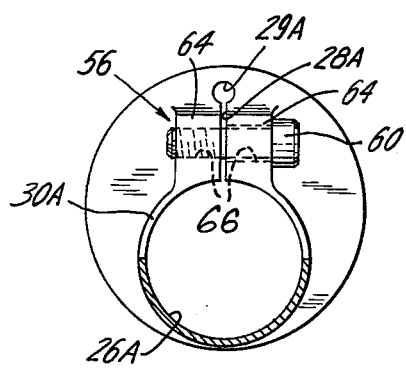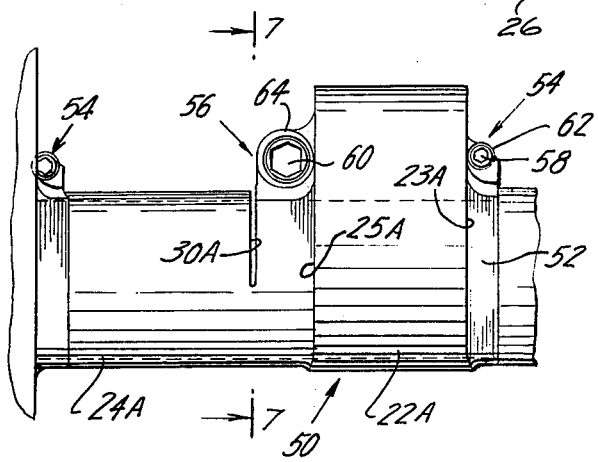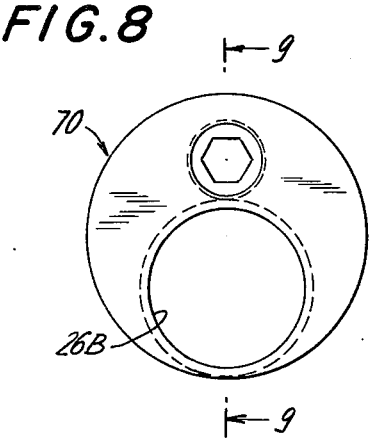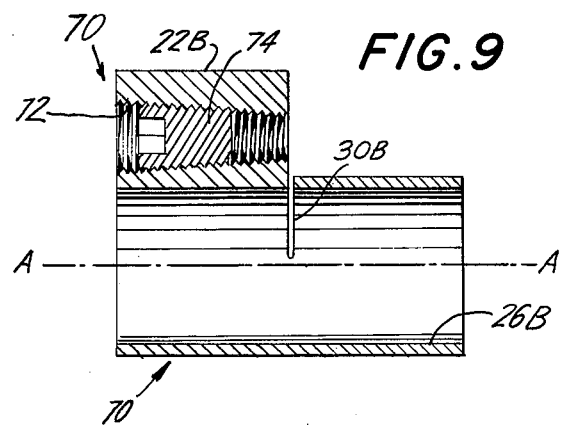

BUILT-UP MAINSHAFT FOR MULTI-UNIT ROTARY MECHANISMS AND METHOD OF MANUFACTURE THEREOF

This invention relates to multi-unit rotary mechanisms, and more particularly, to an improved built-up mainshaft for such rotary mechanisms and the method of manufacture of such improved built-up mainshaft.

As exemplified in the following listed U.S. patents, there have been many attempts at providing an inexpensive and yet effective mainshaft for multi-unit rotary mechanisms, particularly of the Wankel type wherein each unit consists of a rotor supported on a shaft eccentric portion for planetary rotary movement in a housing cavity: U.S. Pat. Nos: Herr, 1,858,014; Butterfield, 2,595,761; Bentele, 3,062,435; Froede, 3,077,867; Jones, 3,240,423; Takebayashi, 3,279,279; Kuroda, 3,352,290; Sharples, 3,620,656; Miller, 3,938,477.

The problems of assembly and disassembly of multi-unit rotary mechanisms have led to the development of built-up or sectional mainshafts. Heretofore in such built-up or sectional mainshafts, assembly and disassembly of the mechanisms has proven complex and difficult, including the alignment of main bearings when split gears such as disclosed in Bentele U.S. Pat. No. 3,062,435 are used, or shaft alignment when segmented shafts such as disclosed in the patent to Takebayashi, U.S. Pat. No. 3,279,279 and Kuroda, U.S. Pat. No. 3,352,290 are used.

Accordingly, it is an object of this invention to provide a built-up mainshaft for multi-unit rotary mechanisms which is relatively inexpensive and quick and easy to manufacture.

Another object of the present invention is to provide a built-up mainshaft for a multi-unit rotary mechanism which is capable of being quickly and easily disassembled and reassembled.

A further object of this invention is to provide a method of fabricating a built-up mainshaft for a multi-unit rotary mechanism wherein accurate angular positioning of eccentric elements is attainable and concentricity of the peripheral surface of each eccentric element is attainable.

SUMMARY OF THE INVENTION

Accordingly, the present invention contemplates a novel built-up mainshaft or rotor shaft for use in multi-unit rotary mechanisms having a plurality of rotors each of which is supported by the mainshaft for planetary rotary movement in a housing cavity, the built-up mainshaft basically comprises the following combination of elements:

An elongated shaft element is provided which is of a length to extend through each of the housing cavities;

An eccentric element for each rotor is telescopically disposed on the shaft element and in end-to-end relation to an adjacent eccentric element.

Each eccentric element comprises a generally cylindrical body portion for supporting a rotor and an axially extending sleeve-like portion integral with the cylindrical body portion and extending from the latter with its axis radially offset from the axis of the cylindrical body portion. Also a bore extends through the sleeve-like and cylindrical body portions of each eccentric element. The bore is of such cross-sectional size and shape as to receive therethrough the shaft element. Scoring means is provided in each eccentric element to render the cylindrical body portion thereof capable of deformation inwardly toward the shaft element. A clamping means is provided for each eccentric element which coacts with the scoring means of the associated eccentric element to effect deformation of the latter and thereby cause the eccentric element to embrace or grip the shaft element in torque transmitting relationship.

In a narrower aspect of this invention, the scoring means comprises, in one embodiment, a radial slot in the cylindrical body portion extending axially the length of the bore and radially in a plane passing through the axis of the bore and through the sleeve-like portion and into the cylindrical body portion. A chordal slot is also provided to extend in the sleeve-like portion at or adjacent the juncture of the latter and the cylindrical body portion and intersecting the radial slot.

In another embodiment, the scoring means is a tapered, threaded hole extending in the cylindrical body portion parallel to the axis of the bore, and a chordal slot extending in the sleeve-like portion at or adjacent the juncture of the latter and the cylindrical body portion. In this embodiment, the clamping means is a tapered, threaded plug which is turned into the tapered, threaded hole.

In the first mentioned embodiment, the clamping means comprises a tapped hole extending in the cylindrical body portion normal to the plane of the radial slot and a bolt turned into the tapped hole to exert a compressive force on the cylindrical body portion across the radial slot.

In another embodiment, the clamping means comprises two sets of ears extending axially and outwardly of the hub portion adjacent to the cylindrical body portion, one set being disposed on each side of the cylindrical body portion. A bolt for each set of ears is turned into threaded holes in the ears to draw the adjacent ears together and hence deform the eccentric element into gripping relation to the shaft element.

The method of manufacturing built-up mainshafts according to this invention, comprises the step of providing each of the eccentric elements with a generally cylindrical body portion and an integral sleeve-like portion having an axis extending radially offset from and parallel to the axis of the cylindrical body portion, then scoring each of the eccentric elements to render the cylindrical body portion deformable in an inward direction, and thereafter angularly positioning each eccentric element on the shaft element and clamping it to the shaft element by deformation of the cylindrical body portion so that the eccentric element is attached to the shaft element in torque transmitting relationship. Each eccentric element has the outer peripheral surface of its cylindrical body portion machined to insure concentricity and proper diametral size.

In a narrower aspect of the method, there is provided an additional step of boring radial holes in the sleeve-like portion of each eccentric element and into the adjacent portion of the shaft element.

BRIEF DESCRIPTION OF THE DRAWING

The invention will now be more fully understood from the following detailed description thereof when considered in connection with the accompanying drawings wherein several embodiments of the invention are illustrated by way of example and in which:

FIG. 1 is a side elevational view of a built-up mainshaft in accordance with this invention;

FIG. 2 is a cross-sectional view taken along line 2—2 of FIG. 1;

FIG. 3 is a view in cross-section taken along line 3—3 of FIG. 1;

FIG. 4 is a transverse cross-sectional view taken along line 4—4 of FIG. 1;

FIG. 5 is an exploded view in perspective of the built-up mainshaft shown in FIG. 1;

FIG. 6 is a side elevational view of first alternative eccentric element forming part of a built-up mainshaft according to this invention;

FIG. 7 is a transverse cross-sectional view taken along line 7—7 of FIG. 6;

FIG. 8 is an end elevational view of a second alternative eccentric element forming part of a built-up mainshaft according to this invention; and FIG. 9 is a longitudinal view in cross-section taken along line 9—9 of FIG. 8.

DESCRIPTION OF THE PREFERRED EMBODIMENTS

Now referring to the drawings, and more particularly to FIGS. 1 to 5, the reference number 10 generally designates the built-up mainshaft, rotorshaft or crankshaft, according to this invention. The built-up mainshaft 10 has application to multi-unit rotary mechanisms (not shown) of the type such as disclosed in the U.S. Pat. Nos. 3,240,423 to Jones, dated Mar. 15, 1966; 3,062,435 to Bentele, dated Nov. 6, 1962; 3,193,187 to Jones et al, dated July 6, 1965; 3,077,867 to Froede, dated Feb. 19, 1963; 3,279,279 to Takebayashi, dated Oct. 18, 1966 and 3,938,477 to Miller et al, dated Feb. 17, 1976. In these multi-unit rotary mechanisms, the housing forms a plurality of cavities (not shown) in each of which is supported a rotor (not shown) by a mainshaft of the type according to this invention for planetary rotary movement within its associated cavity.

The built-up mainshaft 10 comprises generally an elongated shaft element 12, a plurality of eccentric elements 14 telescopically receivable on the shaft element in end-to-end relationship to each other and clamping means 16 for each eccentric element 12 to frictionally secure the eccentric elements on the shaft in torque transmitting relationship.

The shaft element 12, as shown in the drawings, comprises an elongated cylinder of a length depending upon the number of units in the multi-unit mechanism and is at least of such length as to extend through each of the housing cavities (not shown). One end of the shaft element 12 may be provided with a connecting flange 18 or other suitable means (not shown) such as splines, keys, gears or the like, for connecting the shaft element 12 to a member (not shown) to drive the latter or to be driven by the member. The opposite end of shaft element 12 is free to slidably receive thereon eccentric elements 12. The shaft element 12 may be provided, as shown, with a longitudinally extending bore 20 which, in the assembled mechanism 10, can serve as a lubricant supply passage such as is shown and described in the U.S. patent to Bentele, U.S. Pat. No. 3,176,915 dated Apr. 6, 1965.

Each of the eccentric elements 14 comprises a generally cylindrical body portion 22 having opposite side faces 23 and 25 and an integral sleeve-like portion 24 extending from at least one of the side faces of the cylindrical body portion with its longitudinal axis A—A radially offset from and extending parallel to the longitudinal axis B—B of the cylindrical body portion (see FIGS. 1 and 2). A bore 26, coaxial with the axis A—A, extends through both the cylindrical body portion 22 and sleeve-like portion 24. The cross-sectional shape and size of bore 26 is such as to permit shaft element 12 to pass therethrough. It is preferred that the clearance between bore 26 and the outer periphery of shaft 12 be very small, as for example in the order of 0.001 of an inch. Each of the eccentric elements 14 are scored or slotted to render the eccentric element deformable in an inward direction to engage and grip shaft element 12. In the embodiment shown in FIGS. 1 to 5, the scoring is in the form of a first slot 28 extending axially at least the length of cylindrical body portion 22 and through faces 23 and 25, but preferably extends to include the length of sleeve-like portion 24, and radially from bore 26 in a plane passing through the axes A—A and B—B. To further improve the deformability of eccentric element 14, a chordal shaped slot 30 is provided in sleeve-like portion 24 at or near the juncture of sleeve-like portion 24 and cylindrical body portion 22. The slot 30 intersects slot 28 in a plane transverse to slot 28. The blind end portion of slot 28 in cylindrical body portion 22 may be provided with an enlarged cylindrical opening 29 for stress relief purposes.

The clamping means 16 comprises a hole 32 bored, from peripheral surface 34 of cylindrical body portion 22 past slot 28, with the axis of hole 32 extending substantially normal to slot 28. The hole 32 is counterbored at peripheral surface 34 to form a recessed annular shoulder 36. The part 38 of hole 32 on the opposite side of slot 28 from shoulder 36 is threaded to receive bolt 40. The head of bolt 40, when the latter is turned in threaded part 38, abuts shoulder 36 and thereby applies a compressive force on cylindrical body portion 22 across slot 28 to narrow the slot and thus deform cylindrical body portion inwardly against shaft element 12. The bolt 40 is tightened to the extent necessary to place the eccentric and shaft elements in torque transmitting engagement with each other.

In a calculation to determine the practical feasibility of the invention relative to the torque requirements of the eccentric of a Curtiss-Wright Wankel engine, designated RC 75, at 140 horsepower, at 6,000 rpm, it was found that the interference fit achievable was 123 times the torque requirement with a clamp load of 14,000 pounds. This was computed from the following formulas:

$$P = (2F/ld)$$

$$T = u\, Pr^2 2$$

wherein:
 $T$ = torque
 $u$ = 0.78 the coefficient of friction for hard steel on hard steel — dry
 $P$ = pressure on the shaft element per unit length computed from the formula: $P = (2F/ld)$
 $r$ = radius of shaft element
 $\pi$ = 3.1246
 $F$ = clamp load
 $l$ = length
 $d$ = diameter of the shaft element From these formulas, based upon a 14,000 pound clamp load applied by bolt 40 ½ inch from the 2 inch diameter shaft element, the clamp load P was determined from the formula $P = (2F/ld)$ to be 8,200 psi.

From the formula $T = u\ Pr^2\ 2\ \pi$, the torque was determined to be $T = 0.78 \times 8{,}200\ psi \times 2^2 \times 2\ \pi$ or 161,000 inch pounds. This torque force proved to be 123 times greater than the torque of 1,470 inch pounds required for the eccentric of the Wankel engine of Curtiss-Wright Corporation at 140 hp at 6,000 rpm.

In the method of assembly of built-up mainshaft 10 according to this invention, as best shown in FIG. 5, each eccentric element 14 is slid upon shaft element 12 in endwise abutment with each other and secured, by tightening of bolts 40 to shaft element 14, in proper angular position to each other (see FIG. 2). Thereafter, one or more radial holes 42 are bored in sleeve-like portion 24 of each eccentric element 14 and into shaft element 12 to communicate with lubricant supply passage 20, the portion extending through shaft element wall is designated 42a. These holes 42 function in the assembled mechanism (not shown) to conduct lubricant to bearings (not shown) surrounding sleeve-like portions 24. In addition, the holes 42 and associated aligned holes 42a in shaft element 12 also function to properly angularly align the eccentric elements 14 upon reassembly of built-up mainshaft 10 after disassembly of the mechanism for repair or inspection. Also, as best shown in FIG. 3, radially extending holes 44 are bored in cylindrical body portions 22 to extend from peripheral surface 34 into shaft element 12 and into communication with lubricant supply passage 20. These radial holes 44 serve to conduct lubricant to each of the bearings (not shown) disposed between each of the cylindrical body portions 22 and the hubs of the associated rotors (not shown) in the assembled mechanism (not shown).

In FIGS. 6 and 7 is shown a second alternative eccentric element 50 according to this invention which is suitable for use in a built-up mainshaft, such as mainshaft 10. This eccentric element 50 essentially differs from eccentric element 14 in the means for clamping the eccentric element to shaft element 12. Parts of eccentric element 50 corresponding to like parts of eccentric element 14 will be designated by the same number but with a suffix A added thereto.

Each of the eccentric elements 50 comprises a cylindrical body portion 22A which has side faces 23A and 25A and an integral sleeve-like extension portion 24A which extends from side face 25A. The integral sleeve-like portion 24A includes a similar integral sleeve-like portion 52 extending from side face 23A of cylindrical body portion 22. To render the eccentric element 50 deformable, a radial slot 28A and a chordal slot 30A, similar to scoring slots 28 and 30 of eccentric element 14, are shown in FIGS. 1 to 5. The chordal slot, however, in sleeve-like portion 24A is axially spaced from the juncture of cylindrical body portion 22A and sleeve-like portion 24A rather than being at or near the juncture of those corresponding portions of eccentric element 14.

The clamping means of eccentric element 50 comprises two sets of pairs of ears 54 and 56 disposed adjacent end faces 23A and 25A and transverse bolts 58 and 60. Each ear 62, of set of ears 54, are formed integral with cylindrical body portion 22A and sleeve-like portion 24A with one ear disposed on each side of slot 28A as is best shown in FIG. 7. Similarly, each ear 64, of set of ears 56, are formed integral with cylindrical body portion 22A and sleeve-like portion 52 with one ear disposed on each side of slot 28A which extends axially through sleeve-like portion 52 as well as sleeve-like portion 24A. Ears 64 have aligned holes 66 at least one of which is threaded to receive bolt 60, while ears 62 have similar aligned holes (not shown) to receive bolt 58. Because of space limitations, the ears 62 and their associated bolt 58 may, as shown, be of smaller size than ears 64 and their associated bolt 60.

In the method of assembly of a mainshaft 10 utilizing eccentric elements 50, eccentric elements 50 are positioned on the shaft element 12 (not shown in FIGS. 6 and 7) and secured to the latter by tightening bolts 58 and 60 to provide the desired interference fit for transmission of the torque load between the two elements. The steps of machining, as for example by grinding, peripheral surface of cylindrical body portion 22A to insure proper size and concentricity are followed along with boring of the radial lubricant holes (not shown).

In FIGS. 8 and 9 is shown a third alternative eccentric element 70 according to this invention which is suitable for use in a built-up mainshaft, such as mainshaft 10. This eccentric element 70 differs essentially from eccentric element 14 in both the scoring and clamping means. In view of the similarity of these structures, parts of eccentric element 70 corresponding to like parts of eccentric element 14 will be designated by the same number but with the suffix B added thereto.

In FIGS. 8 and 9 the eccentric element 70 comprises, instead of tapped holes and mating bolts extending transversely of the axis A-A of bore 26 of eccentric element 14, a tapered, threaded hole 72 formed in cylindrical body portion 22B to extend along a line parallel to the axis A-A of bore 26B. This hole 72 serves, in cooperation with chordal slot 30B, to render the cylindrical body portion 22B deformable in an inward direction to grip a shaft element (not shown) when a tapered, threaded plug 74 is turned into hole 72.

It is believed now readily apparent that the present invention provides a built-up mainshaft for a multi-unit rotary mechanism and its method of manufacture which is relatively inexpensive and easy. It is a built-up mainshaft which simplifies the assembly of a multi-unit rotary mechanism.

Although several embodiments of the invention have been illustrated and described in detail, it is to be expressly understood that the invention is not limited thereto. Various changes can be made in the arrangement of parts without departing from the spirit and scope of the invention as the same will now be understood by those skilled in the art.

What is claimed is:

1. A built-up mainshaft for a multi-unit rotary mechanism comprising:
   a. an elongated shaft element of substantially uniform outside dimensions for substantially the entire length thereof;
   b. a plurality of eccentric elements;
   c. each eccentric element comprises:
      c-1. a relatively rigid, generally cylindrical body portion for supporting a rotor;
      c-2. a sleeve-like portion integral with the cylindrical body portion and extending with its axis parallel and radially offset from the axis of the cylindrical body portion;
      c-3. a bore extending through the sleeve-like portion and cylindrical body portion and of a cross-sectional size and shape to receive therethrough said shaft element;
      c-4. a slot in said cylindrical body portion and in the sleeve-like portion extending in a plane containing the longitudinal axis of said bore the full length of the cylindrical body portion and into the sleeve-like portion and radially to a point short of the outer periphery of the cylindrical portion;

c-5. scoring means in said sleeve-like portion adjacent the cylindrical body portion and extending in a plane normal to the plane containing the longitudinal axis of the bore and communicating with said slot; and d. a clamping means for each eccentric element co-acting with the said slot and scoring means to effect deformation of the cylindrical body portion and thereby cause the cylindrical body portion to embrace said shaft element in torque transmitting relationship.

2. The apparatus of claim 1 wherein said scoring means is a chordal slot in said sleeve-like portion.

3. The apparatus of claim 2 wherein the clamping means comprises:

a. at least one pair of ears spaced on opposite sides of the first-mentioned slot and on at least one side of the cylindrical body portion;

b. each pair of ears extending outwardly from the sleeve-like portion and from the adjacent portion of the cylindrical portion;

c. a bolt for each pair of ears to exert compressive force on the eccentric element across the first-mentioned slot.

4. The apparatus of claim 3 wherein said chordal slot in the sleeve-like portion is adjacent the side of the ears away from the cylindrical body portion.

5. The method of constructing a built-up mainshaft for supporting a plurality of rotors in adjacent housing cavities for planetary rotary movement, the mainshaft having an elongated shaft element of substantially uniform outside dimensions throughout substantially the entire length and a plurality of eccentric elements telescopically received on the shaft element; the method steps comprises:

a. providing each of the eccentric elements with a generally cylindrical, relatively rigid, body portion and an integral sleeve-like portion having an axis extending radially offset from and parallel to the axis of the cylindrical body portion;

b. making a first slot in each of the eccentric elements to extend the full length of the cylindrical body portion and sleeve-like portion and radially to a point short of the outer periphery of the cylindrical body portion and forming a second slot in the sleeve-like portion to extend transversely of the axis of said shaft element and intersecting the first slot to thereby render the eccentric element deformable in an inward direction;

c. angularly positioning each eccentric element on the shaft element and clamping it to the shaft element by deformation of the cylindrical body portion so that the eccentric element is attached to the shaft element in torque transmitting relationship; and d. machining the outer peripheral surface of each cylindrical body portion of each eccentric element to insure concentricity of the outer peripheral surface.

6. The method of claim 5 wherein a step is provided for forming a plurality of holes extending radially through the sleeve-like portion and the contiguous portion of the shaft element.

* * * * *